June 14, 1955  K. R. HENRYSSON  2,710,553
TOOL FIXTURE FOR LATHES
Filed Nov. 29, 1951  2 Sheets-Sheet 1

INVENTOR

Karl Ragnar Henrysson

June 14, 1955  K. R. HENRYSSON  2,710,553
TOOL FIXTURE FOR LATHES
Filed Nov. 29, 1951  2 Sheets-Sheet 2

INVENTOR

Karl Ragnar Henrysson

United States Patent Office 2,710,553
Patented June 14, 1955

2,710,553
TOOL FIXTURE FOR LATHES

Karl Ragnar Henrysson, Stockholm, Sweden

Application November 29, 1951, Serial No. 258,833

3 Claims. (Cl. 82—36)

The present invention refers to tool fixtures for lathes and more particularly to tool fixtures of the type comprising a carrier which may be secured to the tool slide of the lathe and an exchangeable, vertically adjustable tool holder which is supported by said carrier and has means for holding a separate cutting tool.

The main object of the invention is to provide a tool fixture of the type described which by co-operation between the carrier and the tool holder allows, for the first thing an exact vertical adjustment of the cutting tool relative to the carrier and the tool slide, and thus also relative to the work piece in the lathe, and for the other a repeated removal and re-insertion of the cutting tool and the holder in an exact, only in tensionally variable position of height.

The invention also has for its object to provide a tool fixture as described, in which the carrier and the tool holder in combination are forming a solid and reliable support for the cutting tool independently of the main direction of the cutting tool relative to the tool fixture during work.

Another object of the invention is to provide a tool fixture, which is usable for roughing as well as for finishing with a plurality of different cutting tools, and which allows the use of so-called tool bits of different types in the finishing.

Figure 1:
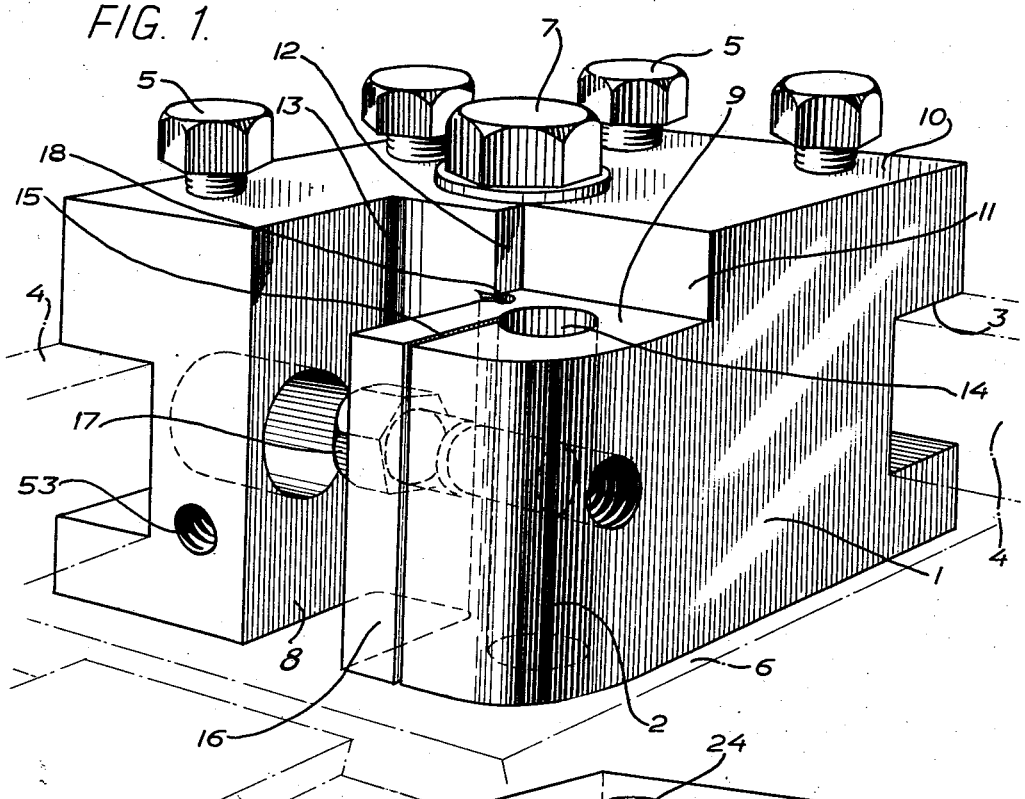

Still further objects of the invention will become evident from the following detailed description of a preferred embodiment of the tool fixture according to the invention illustrated in the accompanying drawings, wherein:

Fig. 1 is a perspective view of the carrier of the tool fixture.

Figure 2:
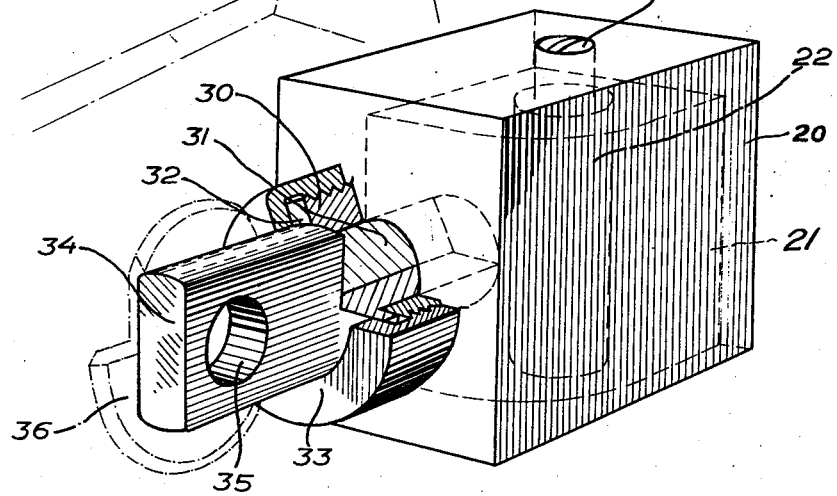
Figure 3:
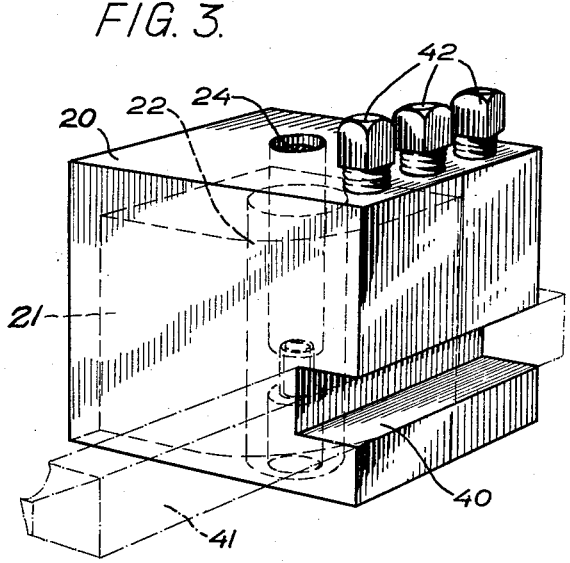
Figure 4:
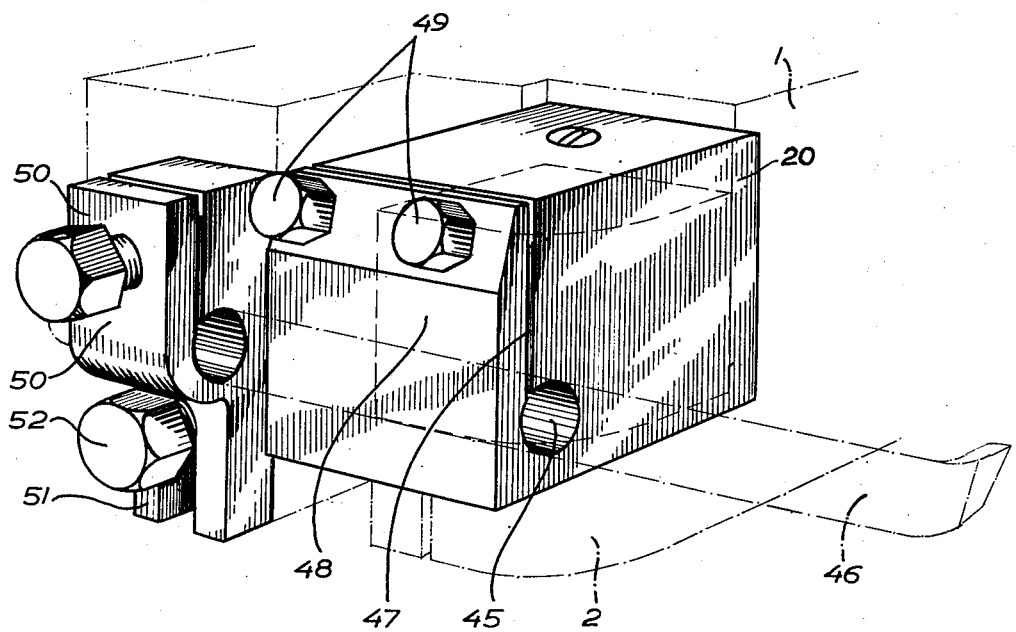

Fig. 2 is a perspective view of a tool holder for a particular type of threading tool, Fig. 3 is a perspective view of a tool holder for ordinary tool bits for external turning, and Fig. 4 is a perspective view of a tool holder and an auxiliary support for a bar tool for internal turning. The different tool holders shown in Figs. 2, 3 and 4 are all intended for being carried, one at a time, by the carrier shown in Fig. 1, and they are viewed in the drawing from the same point as the said carrier and in the position they assume relative to the carrier during operation.

Figure 5:
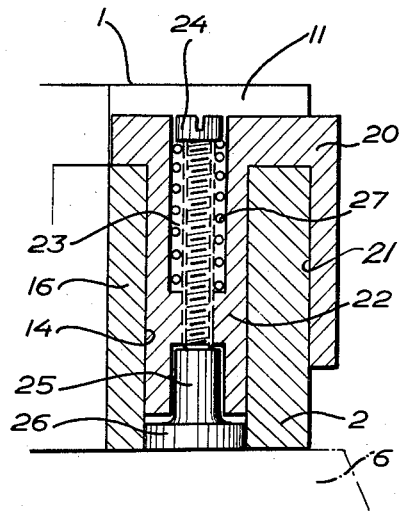

Fig. 5 shows a vertical section taken through the pin of the tool holder and straight across the corner portion of the carrier which carries the tool holder when said parts have been united, Fig. 5 in principle being general for all tool holders which, according to the invention, are to be used in combination with the carrier and shall be able to co-operate with the same in a certain manner.

It should be pointed out already now that the invention does not deal with the particular, substantially the outer shape of the tool holder, which will depend upon what type of cutting tool it shall serve to hold. It is an obvious matter that different types of cutting tools require different tool holders if they shall be utilized and held in the proper way during work, and Figs. 2, 3 and 4 are merely exemplifying some different tool holder designs.

Referring now to Fig. 1, the one main part of the tool fixture, the so-called carrier 1, consists of a body with substantially rectangular bottom surface—preferably made of steel like the other parts of the tool fixture—one corner portion 2 of which (the foremost one in the drawing) is arranged to carry a tool holder, the latter being described in detail later on in the text. At its two side edges turning away from the corner portion 2, the carrier 1 is provided with horizontally extending channel-shaped side recesses 3, in which heavy lathe tools 4 of normal type may be clamped in known manner by means of jam screws 5. The carrier 1 is intended to rest with its bottom side against a tool slide 6, to which it can be locked by means of a central lock bolt 7, which also constitutes a shaft of rotation for the carrier 1, so that the latter can be rotated on the tool slide 6 into a suitable working position according to whether the work is to be performed by one or the other of the two cutting tools 4 or the cutting tool carried by the tool holder at the corner portion 2.

One of the side surfaces of the carrier 1 which is adjacent the corner portion 2 has a vertical recess extending in the full height of the carrier, thus causing the corner portion 2 to protrude freely from the carrier 1. The top face 9 of the corner portion 2 is located somewhat lower than the top face 10 of the remaining part of the carrier 1, the lower face extending somewhat farther into the carrier 1 than the recess 8 and being limited by surfaces 11 and 12 forming an inner corner. The one, 12, of said surfaces forms an outer, right-angled corner with the bottom surface 13 of the recess 8.

In the corner portion 2 is a vertical, through-passing hole 14 having diameter of substantial dimension relative to the top face 9. The said hole 14 is disposed not far from the vertical surface 11 and substantially in the middle of the width of the corner portion, and it is slotted by a slit 15 extending parallel to that side face of the corner portion 2 which faces the recess 8. The split 15 opens approximately tangentially into the hole 14 in the vicinity of the recess 8, thereby dividing the corner portion 2 into a rigid front part and a resilient tongue 16, which, by means of a clamp bolt 17 passing freely through the tongue and threaded into the rigid front part of the corner portion 2, can be pressed against said front part for providing a clamping effect around a well fitting pin of the tool holder inserted in the hole 14. To increase the resilience of the tounge 16, a narrow hole 18 slotted up towards the recess 8 is provided through the corner portion 2 at the base of the tongue 16, adjacent the surfaces 12 and 13.

The corner portion 2 has vertical outer side or front faces, which form a substantially right angle to each other and merge curved into each other to form a rounded contact surface for the tool holder. The curve shape of the corner portion 2 is eccentric relative to the hole 14, and more particularly the corner portion is rounded along a curve, the centre of which lies in that point on the periphery of the hole 14, that is nearest to the recess 8.

Each one of the tool holders according to Figs. 2, 3 and 4 consists of a body 20 formed, on the whole, as a box or casing, which is open rearwards-downwards and is composed of three rectangular walls forming right angles with one another, one side wall of said box or casing being provided with means for holding a cutting tool. The cavity 21 of the box or casing limited by the walls is so shaped, that it corresponds substantially to the shape of the previously described corner portion 2 of the carrier 1, and the upper horizontal portion of the body 20 has a contour which in the remote corner corresponds to the contour of the top face 9 of the corner portion 2 in Fig. 1. When the tool holder is placed on the carrier 1, the body 20 will thus rest tightly with inner support faces against the vertical side surfaces of the corner portion 2. As will appear from the following text, on the other hand, it is not necessary that the body 20 rests tightly against the top face 9 of the corner portion 2. A vertical pin 22 is provided in the upper part of the body 20, which pin fits exactly in the hole 14 of the carrier, and thus the body 20 will be guided externally as well as internally by the bored corner portion 2, whereby the horizontal position of the body 20 relatively the carrier 1 is exactly predetermined.

The vertical pin 22 in the body 20 has a central hole 23 accommodating an adjusting screw 24, by the aid of which the vertical position of the body 20 relative to the carrier may be regulated. The co-operation between the body 20 and the corner portion 2 of the carrier 1 will appear more clearly from Fig. 5, to which is now particularly referred. The hole 23 has at its top a relatively large diameter, so that the head of the adjusting screw 24 can be completely sunk below the top surface of the body 20 and move a considerable distance downwards in the pin 22. Then the hole 23 merges into an intermediate threaded portion with which the thread of the adjusting screw 24 engages and below said threaded portion the hole 23 widens up again to receive a cylindrical support stem 25 on a shoulder 26, which preferably is detachably clamped in the bottom of the hole 14 in the corner portion 2 of the carrier and is in fact resting against the tool slide 6. The lower end or point of the adjusting screw 24 rests against the top surface of the supporting stem 25, and the body 20 can be raised in relation to the corner portion 2 by screwing the adjusting screw into the pin 22, and vice versa. In other words, the vertical position of the body 20 is regulated exclusively by the adjusting screw 24, which always remains the tool holder.

To prevent unintentional alterations of the position of the adjusting screw and thus also of the vertical position of the body by vibrations, shocks or the like—as mentioned already the adjusting screw is completely sunk in the body 20 and accordingly unaffectable in any other way without using tools—a locking compression spring 27 concentric with the adjusting screw is provided between a shoulder in the hole 23 and the lower side of the screw head.

The body 20 with the recently described parts co-operating with the corner portion 2 of the carrier 1 forms the main portion of each one of the tool holders shown in Figs. 2, 3 and 4. In Fig. 2 that side of the body 20, which crosses the free end of the corner portion 2, is provided with an externally threaded, annular projection or socket 30 with centre hole extending into the body 20. Inserted in said centre hole is a horizontal cylindrical pin 31 with a collar or flange 32 resting against the outer end face of the socket 30, which collar or flange is pressed against the socket 30 by a clamping sleeve 33. Outside the flange 32 the pin 31 merges into a flattened portion 34 with a transverse hole 35, and a threading tool 36 of particular type can be secured to the said flat portion 34 in known manner by means of a bolt and nut (not shown in the drawing). The desired angular position of the cutting tool 36 is obtained by turning the pin 31, 34.

In the tool holder according to Fig. 3 the side of the body 20 which parallels the longitudinal direction of the corner portion 2 is fitted with a horizontal channel-like side groove 40, in which a straight tool bit 41 with rectangular or square cross section may be clamped in known manner by means of clamping screws 42.

In the tool holder illustrated in Fig. 4, that side of the body 20 which crosses the longitudinal direction of the corner portion 2 is provided with a horizontal, through-passing and slotted hole 45 paralleling said side and intended to receive a bar tool 46 for internal turning. Said bar tool is secured in the hole by means of a clamping tongue 48, which is partially spaced from the body 20 by the slit 47 and is pressed towards the body 20 by the aid of two bolts 49 provided at the top thereof. If the length of the bar tool 46 is substantial, i. e. when the turning shall take place on great depth in the work piece, the bar tool 46 may be further stabilized by means of an additional support 50, which can be clamped around the bar tool 46 in the principle as was recently described with reference to the tool holder proper, and which through a fork-shaped lower portion 51 can be secured to the carrier at variable heights by means of a bolt 52 threaded into a hole 53 (see Fig. 1) provided in that part of the carrier which is spaced from the corner portion 2 by the recess 8. Preferably, the support 50 is permanently fixed to the bar tool as long as the latter remains in the tool holder and is not clamped to the carrier 1 until the vertical position of the tool is fixed by the tool holder in the way already described.

Of course the invention is not confined to the embodiment illustrated by the drawings, as the shape, size and arrangement of the parts may vary substantially within the scope of the appended claims.

I claim:

1. In a tool fixture for lathes of the type comprising a supporting member adapted to be secured to the tool slide of the lathe and an exchangeable, vertically adjustable tool holder carried by said supporting member and having means for holding a separate cutting tool, the combination of a vertical hole in said tool holder, said hole having open ends, a threaded constriction intermediate the ends of said hole, a headed height adjusting screw having shorter length than said hole and being threaded through said constriction so as to have both its head and its point concealed within said hole, a helical pressure spring inserted between said constriction and the head of said height adjusting screw within said hole, a seat for said tool holder on said supporting member and an upstanding projection on said supporting member entering the lower end of said hole in said tool holder and forming a rest for the concealed point of said height adjusting screw within said hole.

2. In a rotatable tool fixture for lathes a substantially square supporting block with vertical sides, a rounded vertical corner on said block, horizontal grooves for receiving conventional heavy tools in the sides of said block remote from said rounded corner, an incut in one of the sides of said block adjacent said rounded corner, said incut extending vertically over the whole height of said block and having a substantial depth so as to divide a portion of said block into two spaced shanks, one of which carries said rounded corner, a vertical clamping hole in said rounded shank, the centre of said hole being excentrically located with respect to the centre of the curvature of said rounded corner, a vertical, narrow slot extending from the outer end of said rounded shank near said incut and opening non-radially into said clamping hole thereby dividing said rounded shank into an outer rigid portion bearing said rounded corner and a flexible clamping flap, bolt means for pressing said flexible flap towards said rigid portion for narrowing said clamping hole, a rest in said clamping hole and near the bottom thereof, said rest having a stem of considerably less diameter than said clamping hole projecting upwards centrally within said clamping hole and a tool holder comprising a substantially square top portion covering the top surface of said rounded shank, vertical side walls extending downwardly from the two adjacent outer edges of said top portion, said side walls being internally curved to fit and contact said rounded corner of said supporting block, a tubular pin projecting downwardly from the underside of said top portion and entering said clamping hole of said supporting block to be clamped therein, the central hole of said tubular pin opening upwardly through said top portion and having a threaded constriction intermediate its ends, the lower end of said central pin hole receiving the upper end of said stem in said clamping hole of said supporting block, a headed height adjusting screw threaded through said constriction and extending wholly within the length of said central pin hole, a helical pressure spring surrounding said height adjusting screw and being compressed between the screw head and said threaded constriction to avoid inadvertent displacement of said adjusting screw, and means on one of said side walls of said tool holder for securing the tool.

3. In a tool fixture for lathes of the type comprising a supporting member, an exchangeable, vertically adjustable tool holder carried by said supporting member, cooperating guiding means on said supporting member and said tool holder and means on said supporting member for clamping said tool holder, the combination of a tool holder seat at one corner of said supporting member, a top portion on said tool holder partly covering said supporting member, a vertical, tubular pin extending downwardly from said top portion and having open ends, a threaded constriction within said tubular pin, said constriction having substantially less lengths than said pin and being located substantially midway between the ends of said pin, a spring loaded height adjusting screw having shorter length than said tubular pin and being threaded through said constriction so as to be fully concealed within the hole of said tubular pin, a vertical hole in said supporting member, said hole receiving said tubular pin, means for clamping said pin in said hole, an upstanding projection centrally within and near the bottom of said hole, said projection entering the lower open end of said tubular pin and forming a rest for the point of said height adjusting screw, vertical convex contour surfaces on said supporting member and a wall portion on said tool holder extending downwardly from said top portion thereof and having vertical concave inner surfaces corresponding to said convex contour surfaces of said supporting member and contacting the same for guiding said tool holder, said contour surfaces of the supporting member being curved eccentrically with respect to the center of said vertical hole receiving said pivot pin.

References Cited in the file of this patent

UNITED STATES PATENTS

| | | |
|---|---|---|
| 484,317 | Homan | Oct. 11, 1892 |
| 501,052 | Brown | July 11, 1893 |
| 950,329 | Hillenbrand | Feb. 22, 1910 |
| 1,396,461 | Porter | Nov. 8, 1921 |
| 2,466,596 | Krause | Apr. 5, 1949 |
| 2,571,530 | Brekke | Oct. 16, 1951 |

FOREIGN PATENTS

| | | |
|---|---|---|
| 487,121 | Great Britain | June 15, 1938 |